United States Patent [19]

Fukunaga et al.

[11] Patent Number: 4,861,578
[45] Date of Patent: Aug. 29, 1989

[54] METHOD OF TREATING WASTE GAS

[75] Inventors: Akira Fukunaga; Yoichi Mori, both of Kanagawa, Japan

[73] Assignees: Ebara Corporation, Tokyo; Ebara Research Co., Ltd., Kanagawa, both of Japan

[21] Appl. No.: 235,574

[22] Filed: Jul. 26, 1988

[30] Foreign Application Priority Data

Jul. 28, 1987 [JP] Japan .................. 62-186587

[51] Int. Cl.$^4$ .................. B01D 53/02; B01D 53/04; B01D 53/34
[52] U.S. Cl. .................. 423/240; 423/241
[58] Field of Search .................. 423/240 S, 241

[56] References Cited

U.S. PATENT DOCUMENTS

| | | | |
|---|---|---|---|
| 3,744,976 | 7/1973 | Tongue | 423/241 |
| 3,847,552 | 11/1974 | Hobgood et al. | 423/241 |
| 4,472,363 | 9/1984 | Poller et al. | 423/241 |
| 4,594,231 | 6/1986 | Nishino et al. | 423/241 |
| 4,673,558 | 6/1987 | Senoue et al. | 423/240 S |

FOREIGN PATENT DOCUMENTS 35849 2/1986 Japan .
61619 3/1986 Japan .

Primary Examiner—John Doll
Assistant Examiner—Jeffrey Edwin Russel
Attorney, Agent, or Firm—Wenderoth, Lind & Ponack

[57] ABSTRACT

A method of treating a waste gas containing at least boron trichloride and chlorine comprises first treating the waste gas with a treating agent containing a magnesium compound by a dry process and then treating the waste gas with a treating agent containing a calcium compound by a dry process. Thus, it is possible to remove efficiently a chloride and chlorine containing gas from waste gas discharged from a dry etching process or other manufacturing process in the semiconductor industry. In addition, it is possible to reduce the amount of treating agent used, lengthen the treating agent replacing cycle, and facilitate the maintenance of the system.

2 Claims, 1 Drawing Sheet

METHOD OF TREATING WASTE GAS

BACKGROUND OF THE INVENTION

1. Field of the Invention:

The present invention relates to a method of removing $BCl_3$, $Cl_2$, $AlCl_3$, HCl or the like from waste gas discharged from chemical dry etching processes using chloride and/or chlorine containing gases in the semiconductor industry, to thereby making these waste gases harmless.

2. Description of the Prior Art:

It is feared that environmental pollution may be caused by a large variety of harmful gases which are used in semiconductor manufacturing processes in the semiconductor industry. Chloride and/or chlorine containing gases which are contained in waste gas discharged from chemical dry etching processes using chloride and/or chlorine containing gases are extremely harmful to the human body, and therefore it is urgent to establish an effective system for removing such harmful components from the waste gas.

Various kinds of methods of removing chloride and/or chlorine containing gases have heretofore been proposed. These known methods may be roughly divided into two types, that is, wet treating method and dry treating method.

In the wet treating method, waste gas and a cleaning solution which is generally an alkaline aqueous solution, e.g., NaOH, are brought into countercurrent contact with each other in a gas-liquid contact apparatus such as a packed tower or a spray tower to thereby neutralize and absorb harmful chloride and/or chlorine containing gases.

This type of treating method suffers, however, from the following problems: the cleaning solution may flow back to the etching equipment; the waste gas treating apparatus may be clogged with a reaction product; and the treating efficiency is low.

The dry treating method employs a solid treating agent to remove harmful waste gases, and there are two different types of dry treating method, that is, one that employs an agent carried on active carbon as a treating agent for chloride and/or chlorine containing gases [see Japanese Pat. Public Disclosure No. 61-35849 (1986)], and the other that employs an alkaline treating agent alone, that is, without any carrier or the like [Japanese Pat. Public Disclosure No. 61-61619 (1986)].

In the dry treating method, a treating agent is packed in a packed tower and waste gas is passed through the tower to remove harmful components from the waste gas. In this type of method, the operation is simpler and the system is simpler and smaller than in the case of the wet treating method, but the method suffers from the following problems.

The waste gas discharged from chemical dry etching processes using $BCl_3$ and $Cl_2$ contains at least two different kinds of chloride and chlorine containing gas, i.e., $BCl_3$ and $Cl_2$.

When a gas mixture of $BCl_3$ and $Cl_2$, is treated by the dry method, $BCl_3$ and $Cl_2$, are adsorbed by the treating agent in different amounts, respectively. More specifically, in either case where a treating agent carried on active carbon is used or an alkaline agent alone is employed as a treating agent, the adsorptive capacity for either $BCl_3$ or $Cl_2$, is large, but that for the other is small.

For this reason, when dry etching waste gas is treated, if the load of a gas for which the adsorptive capacity of the treating agent is smaller is high, this gas breaks through in a relatively short period of time and therefore the cycle of replacement of the treating agent in the packed tower is shortened, which results in an increase in the amount of treating agent used.

SUMMARY OF THE INVENTION

In view of the above-described circumstances, it is a primary object of the present invention to provide a method of effectively removing, by a dry process, a chloride and chlorine containing gas that contains at least $BCl_3$, and $Cl_2$, from a waste gas discharged from a dry etching process or other manufacturing process in the semiconductor industry, the method enabling a reduction in the amount of treating agent used and permitting a lengthening of the cycle of replacement of the treating agent in the packed tower.

To this end, the present invention provides a method of removing a chloride and chlorine containing gas that contains at least $BCl_3$ and $Cl_2$, from a waste gas discharged from a dry etching or other process, wherein two different kinds of treating agent, that is, a magnesium compound and a calcium compound, are employed, and the chloride and chlorine containing gas is successively brought into contact with the magnesium and calcium compounds in the mentioned order in a packed tower by a dry process. The temperature within said tower is in the range of from about 20° C. to about 80° C. The waste gas is passed through said tower under a pressure of from about 0.9 atm to about 2 atm. The particle size of the treating agents is about 0.3 mm to about 5.0 mm in diameter.

The above and other objects, features and advantages of the present invention will become more apparent from the following description taken in conjunction with the accompanying drawing.

DETAILED DESCRIPTION OF THE PREFERRED EMBODIMENTS

Figure 1:
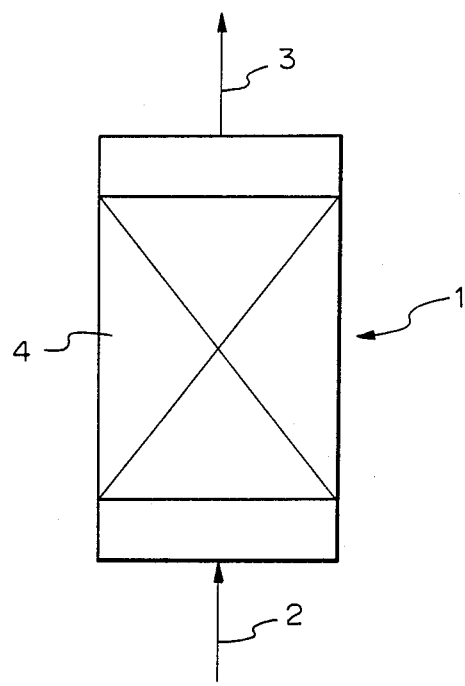
FIG. 1 is a schematic view of an apparatus employed to evaluate the performance of the treating agents used in the present invention.

Examples of chloride and/or chlorine containing gases contained in a dry etching waste gas or the like which is to be treated in the present invention include $BCl_3$, $Cl_2$, $AlCl_3$, HCl, etc. The present invention is effectively applied to a waste gas that contains at least $BCl_3$ and $Cl_2$, which are mixed in an arbitrary ratio.

The waste gas generally has a flow rate of from several to tens of l/min and contains about 0.1 to 10% by volume of $BCl_3$, and $Cl_2$, respectively. The temperature and pressure of the waste gas vary depending on the various constructional aspects of the exhaust system of the exhaust pump used, the exhaust duct, etc. and generally may be about 20°–80° C. and about 1–2 atm, respectively.

Examples of treating agents usable in the present invention are magnesium hydroxide, magnesium oxide and magnesium carbonate or a mixture thereof as magnesium compounds, and slaked lime (calcium hydroxide), calcium oxide and calcium carbonate or a mixture thereof as calcium compounds. These compounds may be carried on appropriate carriers.

These compounds may be used in the form of fragments, tablets, granules, etc. The particle size may be chosen arbitrarily depending on the flow rate of the waste gas and the dimensions of the tower in which the treating agent is packed, and with a view to maximizing the treatment efficiency, it may preferably be in the range of about 0.3 - 5.0 mm in diameter.

When each of the magnesium compounds in the above-described treating agents was brought into contact with a gas containing either $BCl_3$ or $Cl_2$, and a gas mixture containing both of them, the adsorptive capacity for $BCl_3$ was large, but that for $Cl_2$, was extremely small. When each of the calcium compounds was brought into contact with either $BCl_3$ or $Cl_2$, both the adsorptive capacities for the two different kinds of gas were large. However, when it was brought into contact with a gas mixture containing both $BCl_3$, and $Cl_2$,, the adsorptive capacity for $BCl_3$ was large, but that for $Cl_2$ was extremely small.

Therefore, it was revealed that, to remove a gas mixture that contains $BCl_3$, and $Cl_2$, it is impossible to obtain a sufficient treating effectiveness simply by employing one kind of treating agent, that is, either a magnesium or calcium compound, and it is most appropriate to use a combination of these two different kinds of treating agent.

More specifically, the present inventors have found that a gas mixture containing $BCl_3$ and $Cl_2$, can be removed considerably effectively by first removing $BCl_3$ with a magnesium compound and then removing with a calcium compound the residual $Cl_2$ which was not removed with the magnesium compound. The present invention has been accomplished on the basis of this finding.

The waste gas and the treating agents may be brought into contact with each other by the following means. A magnesium compound and a calcium compound are packed in a packed tower in two series stages, respectively, in the required proportion, and waste gas is passed either upward or downward through the packed tower so that the gas is successively brought into contact with the magnesium and calcium compounds in the mentioned order.

Hereinunder, the present invention will be described more specifically by way of examples. However, the present invention is in no way restricted by these examples.

EXAMPLE 1

As magnesium and calcium compounds serving as two treating agents, granulated magnesium hydroxide (particle diameter: 0.42 to 0.50 mm) and granulated slaked lime (particle diameter: 0.42 to 0.50 mm) were employed.

Each of the above-described treating agents 4 was packed in a quartz column 1 (height: 400 mm; diameter: 40 mm) of an experimental apparatus such as that shown in FIG. 1. $N_2$ gases having the following various compositions were supplied to the column 1 from the lower side thereof through an inlet pipe 2: $N_2$ gas containing $N_2$ (0.30 l/min) and $BCl_3$ (0.01 l/min); $N_2$ gas containing $N_2$ (0.28 l/min) and $Cl_2$, (0.03 l/min); and $N_2$ gas containing $N_2$ (0.27 l/min), $BCl_3$, (0.01 l/min) and $Cl_2$, (0.03 l/min). The amount of each of $BCl_3$ and $Cl_2$, absorbed until both $BCl_3$, and $Cl_2$, in the waste gas in the outlet pipe 3 at the upper side of the column 1 were 1 ppm was measured. The gas to be treated was at ambient temperature and was supplied to the column at atmospheric pressure plus about 20 mm $H_2O$.

The results are shown in Table 1 below.

TABLE 1

| Treating agents | $BCl_3$ adsorbing capacity (Nl/kg) | | $Cl_2$ adsorbing capacity (Nl/kg) | |
|---|---|---|---|---|
| | $BCl_3$ alone | $BCl_3$ and $Cl_2$ | $Cl_2$ alone | $Cl_2$ and $BCl_3$ |
| Magnesium hydroxide | 66 | 52 | 1.0 | 0.7 |
| Slaked lime | 23 | 18 | 88 | 8.0 |

As will be clear from Table 1, as to the effectiveness in removing $BCl_3$, magnesium hydroxide is more effective than slaked lime and also has a high adsorptive capacity, i.e., 52 Nl/kg, in the treatment of the gas mixture containing both $BCl_3$ and $Cl_2$. As to $Cl_2$, magnesium hydroxide can remove substantially no $Cl_2$, whereas slaked lime has high removing capability. However, the $Cl_2$, adsorbing capacity of slaked lime for a gas mixture containing both $BCl_3$ and $Cl_2$, is considerably low, i.e., 10% of that in the case of treatment of a waste gas containing $Cl_2$, alone as a harmful component. Accordingly, it may be considered that, to remove a gas mixture that contains $BCl_3$ and $Cl_2$, it is impossible to obtain a sufficient treating effectiveness simply by employing one kind of treating agent, that is, either a magnesium or calcium compound, and it is most appropriate to use a combination of these two different kinds of treating agent.

EXAMPLE 2

An experiment was conducted in order to confirm the waste gas treating effectiveness of the combination of two different kinds of treating agent. With the same treating agents and the same experimental apparatus as in Example 1, 100 g of magnesium hydroxide was packed in the lower stage of the column, and 100 g of slaked lime in the upper stage in series to the lower stage (treating agents 4). $N_2$ gases were treated under the same gas mixture conditions as in Example 1 to measure the amounts of $BCl_3$ and $Cl_2$, absorbed. The results are shown in Table 2 below.

TABLE 2

| Treating agents | $BCl_3$ adsorbing capacity (Nl/kg) | $Cl_2$ adsorbing capacity (Nl/kg) |
|---|---|---|
| Magnesium hydroxide | 50 | — |
| Slaked lime | — | 70 |

The experiment has revealed that magnesium hydroxide has a $BCl_3$ adsorbing capacity of 50 Nl/kg, while slaked lime has a $Cl_2$ adsorbing capacity of 70 Nl/kg, that is, it is possible to obtain harmful gas removing effectiveness as high as that in the case of treating $BCl_3$ or $Cl_2$ alone.

As has been described above, the present invention enables a chloride and chlorine containing gas that contains at least $BCl_3$ and $Cl_2$, to be efficiently removed from waste gas discharged from a dry etching process or other manufacturing process in the semiconductor industry. In addition, it is possible according to the present invention to reduce the amount of treating agent used, lengthen the treating agent replacing cycle, and facilitate the maintenance of the system.

What is claimed is:

1. A method of treating a waste gas containing at least boron trichloride and chlorine, comprising treating the waste gas with a treating agent containing a magnesium compound packed in a tower and subsequently treating said waste gas with a treating agent containing a calcium compound packed in the same or another tower, said magnesium compound being selected from the group consisting of magnesium hydroxide, magnesium oxide, magnesium carbonate and a mixture thereof, said calcium compound being selected from the group consisting of calcium hydroxide, calcium oxide, calcium carbonate and a mixture thereof, the temperature within said tower being in the range of from about 20° C. to about 80° C., the waste gas being passed through said tower under a pressure of from about 0.9 atm to about 2 atm, and the particle size of the treating agents being about 0.3 mm to about 5.0 mm in diameter.

2. A method of treating a waste gas containing at least boron trichloride and chlorine, said waste gas being discharged from a chemical dry etching step using a chloride and/or chlorine containing gas in a semiconductor manufacturing process, comprising treating the waste gas with a treating agent containing a magnesium compound packed in a tower and subsequently treating said waste gas with a treating agent containing a calcium compound packed in the same or another tower, said magnesium compound being selected from the group consisting of magnesium hydroxide, magnesium oxide, magnesium carbonate and a mixture thereof, said calcium compound being selected from the group consisting of calcium hydroxide, calcium oxide, calcium carbonate and a mixture thereof, the temperature within said tower being in the range of from about 20° C. to about 80° C., the waste gas being passed through said tower under a pressure of from about 0.9 atm to about 2 atm, and the particle size of the treating agents being about 0.3 mm to about 5.0 mm in diameter.

* * * * *